July 15, 1924.
E. H. SCHWARZ
1,501,497
CONNECTING MECHANISM
Filed March 3, 1921
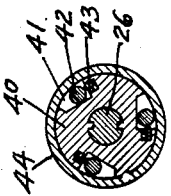
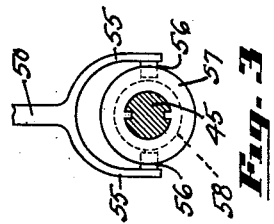
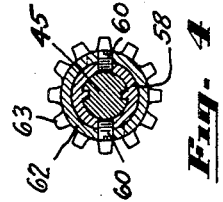
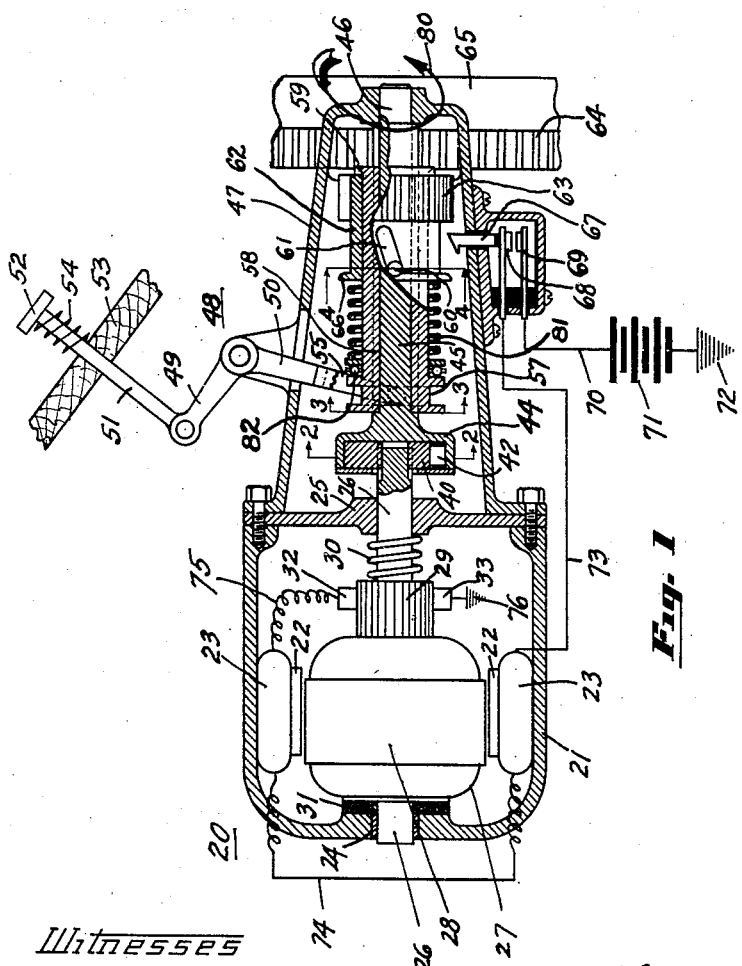
Witnesses
F. J. Hardman
Irvin A. Greenwald
Inventor
Elmer H. Schwarz
By Forrest B. MacNab
Attorney Patented July 15, 1924.

1,501,497

UNITED STATES PATENT OFFICE.

ELMER H. SCHWARZ, OF FORT LEE, NEW JERSEY, ASSIGNOR TO THE DAYTON ENGINEERING LABORATORIES COMPANY, OF DAYTON, OHIO, A CORPORATION OF OHIO.

CONNECTING MECHANISM.

Application filed March 3, 1921. Serial No. 449,457.

*To all whom it may concern:*

Be it known that I, ELMER H. SCHWARZ, a citizen of the United States of America, residing at Fort Lee, county of Bergen, State of New Jersey, have invented certain new and useful Improvements in Connecting Mechanism, of which the following is a full, clear, and exact description.

This invention relates to mechanisms controlling the mechanical connection between a normally disconnected gear and rotatable member, and is especially adapted for use in controlling the connection of an electric motor with the flywheel gear of an internal-combustion engine for the purpose of starting the engine.

One object of the invention is to effect the connecting of the motor with the engine gear by means which is entirely independent of the motion of the motor so that this connection can be substantially completed before the motor is caused to operate. The aim of the invention therefore is to reduce to the minimum the possibility of damage to the engine gear or to the pinion driven by the motor as the pinion is moved into engagement with the engine gear so that the motor may crank the engine.

Other and further objects of the present invention will be apparent from the following description, reference being had to the accompanying drawings, wherein a preferred embodiment of the present invention is clearly shown.

In the drawings:

Fig. 1 is a longitudinal sectional view of an electric motor and the mechanism for connecting the same with an engine gear;

Figs. 2 to 4 inclusive are sectional views taken on lines 2—2, 3—3, and 4—4, respectively, of Fig. 1.

In the drawings, an electric motor 20 includes a field frame 21 supporting poles 22 surrounded by field windings 23. Frame 21 supports bearings 24 and 25 upon which is journalled an armature shaft 26 carrying windings 27 located upon a core 28 normally slightly decentered from poles 22. Shaft 26 carries a commutator 29 connected with windings 27. A spring 30 normally maintains the core 28 in decentered position with a friction disc 31, which is carried by shaft 26, in engagement with the frame 21. In this way rotation of the shaft 26 is yieldingly resisted when the motor is at rest. Brushes 32 and 33 bear upon commutator 29.

The shaft 26 has a splined connection with a clutch member 40 which is provided with notches 41 in which are located rollers 42 pressed by springs 43. The clutch member 44 is journalled upon member 40 and is provided with a shaft extension 45 journalled at 46 in gear housing 47.

A lever 48 is pivoted upon housing 47 and comprises arms 49 and 50. Arm 49 is connected with push rod 51 passing through a stationary part 53 and ending in a pedal 52. A spring 54 interposed between part 53 and pedal 52 yieldingly maintains the lever 48 in the position shown in Fig. 1. The arm 50 is bifurcated to provide forks 55, 55 carrying pins 56, 56 which engage a grooved collar 57 having a sleeve extension 58 splined upon the shaft 45 and provided with a stop shoulder 59. Sleeve 58 supports pins or screws 60 engaging diametrically opposed oblique slots 61 provided in a hub 62 of the pinion 63. Pinion 63 is adapted to engage the gear 64 of a rotating part 65 such as the flywheel of an engine (not shown).

The hub 62 is provided with a shoulder 66 for engaging a plunger 67 to close contacts 68, 69. Contact 69 is connected by wire 70 with battery 71 grounded at 72. Wire 73 connects contact 68 with field coil 23, connected to the upper coil 23 by wire 74. Upper coil 23 is connected to brush 32 by wire 75, and lower brush 33 is grounded at 76.

To connect the motor shaft 26 with the flywheel 65, the pedal 52 is depressed causing the movement to the right, as viewed in Fig. 1, of parts 57, 58, 60, 62 and 63. In case enmeshment takes place without colliding of gear teeth, then the continued downward movement of pedal 52 will cause the pinion 63 to come substantially fully into mesh with gear 64, before the shoulder 66 will have pushed the plunger 67 down far enough to close contacts 68, 69. In this way the gears are engaged before the motor circuit is closed and the liability of stripping gear teeth is reduced to the minimum.

In case the teeth of pinion 63 collide with the teeth of gear 64, then continued downward movement of pedal 52 will cause the pins 60 to move relatively to slots 61 and to effect partial rotation of pinion 63 to bring the teeth of pinion 63 into alignment with the tooth spaces of gear 64. When this takes place enmeshment of these gears can be effected and the motor circuit closed as previously described. The rotation of the pinion 63 by the use of pedal 52 takes place in the direction of arrow 80. As pinion 63 is cammed around, there will be a reaction on pins 60 tending to rotate the sleeve 58 and shaft 45 in the direction opposite to arrow 80. Such a motion of shaft 45 would tend to drive shaft 26 through clutch members 42, 43, 44, 45. Movement of shaft 26 is prevented, however, by the brake device 30, 31 described. When the motor is energized by closing contacts 68, 69, this brake device is released since the field magnets 22, 23 will draw the armature core 28 into symmetrical relation therewith, and then the motor can turn the gear 64 without hindrance from the brake device.

From the foregoing it is apparent that the mechanism which connects the motor with gear 64 operates independently of any movement of the motor, and that therefore the connection of the motor with the engine gear can be substantially completed before the motor circuit is established. Since the teeth of the gear are fully in power transmitting position there is very little liability of breaking gear teeth when the motor begins to operate.

A light spring 81 and a ball bearing 82 are interposed between the grooved collar 57 and the shoulder 66 in order yieldingly to maintain the slots 61 and pins 60 in the relation shown in Fig. 1.

While the form of mechanism herein shown and described constitutes a preferred form of embodiment of the invention, it is to be understood that other forms might be adopted, all coming within the scope of the claims which follow.

What I claim is as follows:

1. In a connecting mechanism, the combination with an overrunning clutch and a driving member having a rotatable shaft connected therewith through said clutch; of a sleeve splined on said shaft; a gear; a pinion adapted to engage said gear; a pin and oblique slot connection between said pinion and sleeve; a spring for normally maintaining said pin and oblique slot in fixed relation; and means for shifting said sleeve.

2. In a connecting mechanism, the combination with an overrunning clutch and a motor having a rotatable shaft connected therewith through said clutch; of a sleeve splined on said shaft; a gear; a pinion adapted to engage said gear; a pin and oblique slot connection between said pinion and sleeve; a spring for normally maintaining said pin and oblique slot in fixed relation; a brake tending to prevent rotation of said sleeve while the pinion is being rotated by the movement of said sleeve relative thereto; means for effecting the release of said brake when the pinion is in substantially full engagement with said gear; and means for shifting said sleeve.

3. In a connecting mechanism, the combination with an overrunning clutch and a driving member having a rotatable shaft connected therewith through said clutch; of a gear; a pinion adapted to mesh with said gear; means for connecting said shaft and said pinion including provisions for shifting said pinion and turning said pinion in case the pinion teeth collide with the gear teeth; a brake tending to prevent rotation of said shaft when the pinion is being turned by said provisions; and means for releasing said brake when the pinion is substantially fully in mesh with said gear.

4. In a connecting mechanism, the combination with a device having a rotatable shaft connected therewith; of a gear; a pinion adapted to mesh with said gear; means for connecting said shaft and said pinion including provisions for shifting said pinion and turning said pinion in case the pinion teeth collide with the gear teeth; a brake tending to prevent rotation of said shaft when the pinion is being turned by said provisions; electromagnetic means for releasing said brake; a switch for controlling said electromagnetic means; and a member for closing said switch when the pinion is substantially fully in mesh with said gear.

5. In a connecting mechanism, the combination with a motor having a brake for maintaining the armature shaft stationary, and a spring for normally setting said brake by decentering the motor armature, of a gear; a pinion adapted to mesh with said gear; means for connecting said pinion and shaft including provisions for shifting said pinion and turning said pinion in case the pinion teeth collide with the gear teeth; a switch controlling the delivery of current to the motor windings; and means for closing said switch when the pinion is substantially fully in mesh with said gear, whereby the motor will operate with the brake released.

In testimony whereof I hereto affix my signature.

ELMER H. SCHWARZ.

Witnesses:
H. E. SOLLENBERGER,
I. A. GREENWALD.